(12) United States Patent
Chutorash

(10) Patent No.: US 10,442,431 B2
(45) Date of Patent: Oct. 15, 2019

(54) AUTOMATIC SPEED LIMITER SET SPEED ADJUSTMENT

(71) Applicant: Richard Chutorash, Rochester Hills, MI (US)

(72) Inventor: Richard Chutorash, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 316 days.

(21) Appl. No.: 15/435,551

(22) Filed: Feb. 17, 2017

(65) Prior Publication Data
US 2018/0237009 A1    Aug. 23, 2018

(51) Int. Cl.
*B60W 30/14* (2006.01)
*G08G 1/0962* (2006.01)
*B60K 37/06* (2006.01)
*B60W 50/10* (2012.01)

(52) U.S. Cl.
CPC ........... *B60W 30/146* (2013.01); *B60K 37/06* (2013.01); *B60W 50/10* (2013.01); *G08G 1/09623* (2013.01); *G08G 1/09626* (2013.01); *B60K 2370/166* (2019.05); *B60K 2370/167* (2019.05); *B60K 2370/168* (2019.05); *B60W 2540/10* (2013.01); *B60W 2550/402* (2013.01)

(58) Field of Classification Search
CPC ..... B60W 30/146; B60W 50/10; B60K 37/06; G08G 1/09623
USPC .......... 701/93, 117–119, 400, 410, 414, 416, 701/423, 465, 532, 23, 27, 36, 40–42, 45, 701/57, 58, 83, 84, 301, 302; 340/995.1, 340/995.13, 995.19, 995.21, 995.23, 435, 340/436, 3.41, 903, 988–996
See application file for complete search history.

(56) References Cited

U.S. PATENT DOCUMENTS

| | | | |
|---|---|---|---|
| 9,177,427 B1* | 11/2015 | Briggs | G07C 5/00 |
| 2011/0130939 A1* | 6/2011 | Hartmann | B60W 10/02 701/93 |
| 2012/0209454 A1* | 8/2012 | Miller | B60W 50/12 701/2 |
| 2014/0121933 A1 | 5/2014 | Slaton et al. | |

FOREIGN PATENT DOCUMENTS

| | | | |
|---|---|---|---|
| WO | 2004007930 A2 | | 1/2004 |
| WO | WO2004-007930 | * | 1/2004 |
| WO | 2007024365 A2 | | 3/2007 |
| WO | 2014159117 A2 | | 10/2014 |
| WO | 2014159997 A1 | | 10/2014 |

* cited by examiner

*Primary Examiner* — Muhammad Shafi
(74) *Attorney, Agent, or Firm* — Ralph E. Smith

(57) ABSTRACT

An intelligent dynamic speed limiting system for use with a motor vehicle is disclosed. The system may have a processor, a memory in communication with the processor, a source of map information that provides posted speed limit information for roads in a geographic region, and a speed set control. The speed set control may be configured to enable a user to select a speed increase value by which a speed of the vehicle may exceed a posted speed limit. The processor may read the speed increase value set by the user and limit the vehicle speed to that of a posted speed limit for a road that the vehicle is travelling on, plus an additional speed increment determined by the processor by using the user set speed increase value.

17 Claims, 3 Drawing Sheets

AUTOMATIC SPEED LIMITER SET SPEED ADJUSTMENT

FIELD

The present disclosure relates to speed control systems for motor vehicles, and more particularly to an dynamically adjustable speed control system which enables a user to input a speed control setting for a vehicle, and which limits a speed increase of the vehicle in accordance with the speed control setting.

BACKGROUND

The statements in this section merely provide background information related to the present disclosure and may not constitute prior art.

Speed limiting systems have been popular in recent years on passenger cars and trucks. Sometimes the speed limiting system forms a portion of an adaptive cruise control systems ("ACCS") of the vehicle, but it need not be an integral portion of an ACCS. Such systems enable the user to set a maximum vehicle speed, and the speed limiting system will not allow the vehicle to be driven faster than the preset maximum speed unless some "override" signal, for example a hard press on an accelerator pedal, is provided by the vehicle operator.

However, present day speed limiting systems do not allow dynamic adjustment of the maximum vehicle speed without user intervention. For example, if a user sets a present day speed limiting system to 75 mph (about 120 kph), the maximum vehicle speed when the user is travelling on a road with a speed limit of 55 mph (about 86 kph) will not be limited. Put differently, if the user is travelling along a road where the speed limit is 55 mph and inadvertently increases the vehicle speed to 67 mph, the speed limiting system would provide no speed limiting operation, because the speed limit is set to 75 mph. The speed limiting system would essentially provide no speed limiting operation until the user attempted to operate the vehicle at a speed greater than 75 mph. So in this example, the user would have to manually reset the speed limiting system to, for example, 60 mph, if she/he wanted to allow only a small (roughly 10%) increase, in the vehicle speed. The same would go for travelling in city and suburban roads where the speed limit may be 40 mph. If the user wanted to limit a maximum vehicle speed to, for example, 45 mph (roughly 10% increase), then she/he would need to reset the maximum vehicle speed for this road speed limit.

From the above, it will be appreciated that in a real world driving scenario, where the user may spend portions of a day driving in city or suburban areas, on a freeway, and on an interstate highway, this would require the user to repeatedly reset the speed limit value for the vehicle's speed limiting system.

SUMMARY

In one aspect the present disclosure relates to a dynamic speed limiting system for use with a motor vehicle. The system may comprise a processor, a memory in communication with the processor, a source of map information that provides posted speed limit information for roads in a geographic region, and a speed set control. The speed set control may be configured to enable a user to select a speed increase value by which a speed of the vehicle may exceed a posted speed limit. The processor may be configured to read the speed increase value set by the user, and to limit the vehicle speed to that of a posted speed limit for a road that the vehicle is travelling on, plus an additional speed increment determined by the processor by using the speed increase value set by the user.

In another aspect the present disclosure relates to a dynamic speed limiting method for use with a motor vehicle. The method may comprise using a source of map information to provide posted speed limit information for roads in a geographic region. The method may further comprise using a speed set control configured to enable a user to select a speed increase value by which a speed of the vehicle may exceed a posted speed limit. The method may further comprise storing the user selected speed increase value in a memory, and using a processor configured to read the speed increase value from the memory, and to obtain, using the source of map information, a posted speed limit for a road that the vehicle is travelling on. The method may further involve having the processor use the speed increase value and the posted speed limit for the road that the vehicle is travelling on to determine a maximum speed that the vehicle is allowed to attain. The processor may further be used to limit vehicle speed to the maximum speed that the vehicle is allowed to attain.

BRIEF DESCRIPTION OF THE DRAWINGS

The drawings described herein are for illustration purposes only and are not intended to limit the scope of the present disclosure in any way.

DETAILED DESCRIPTION

Figure 1:
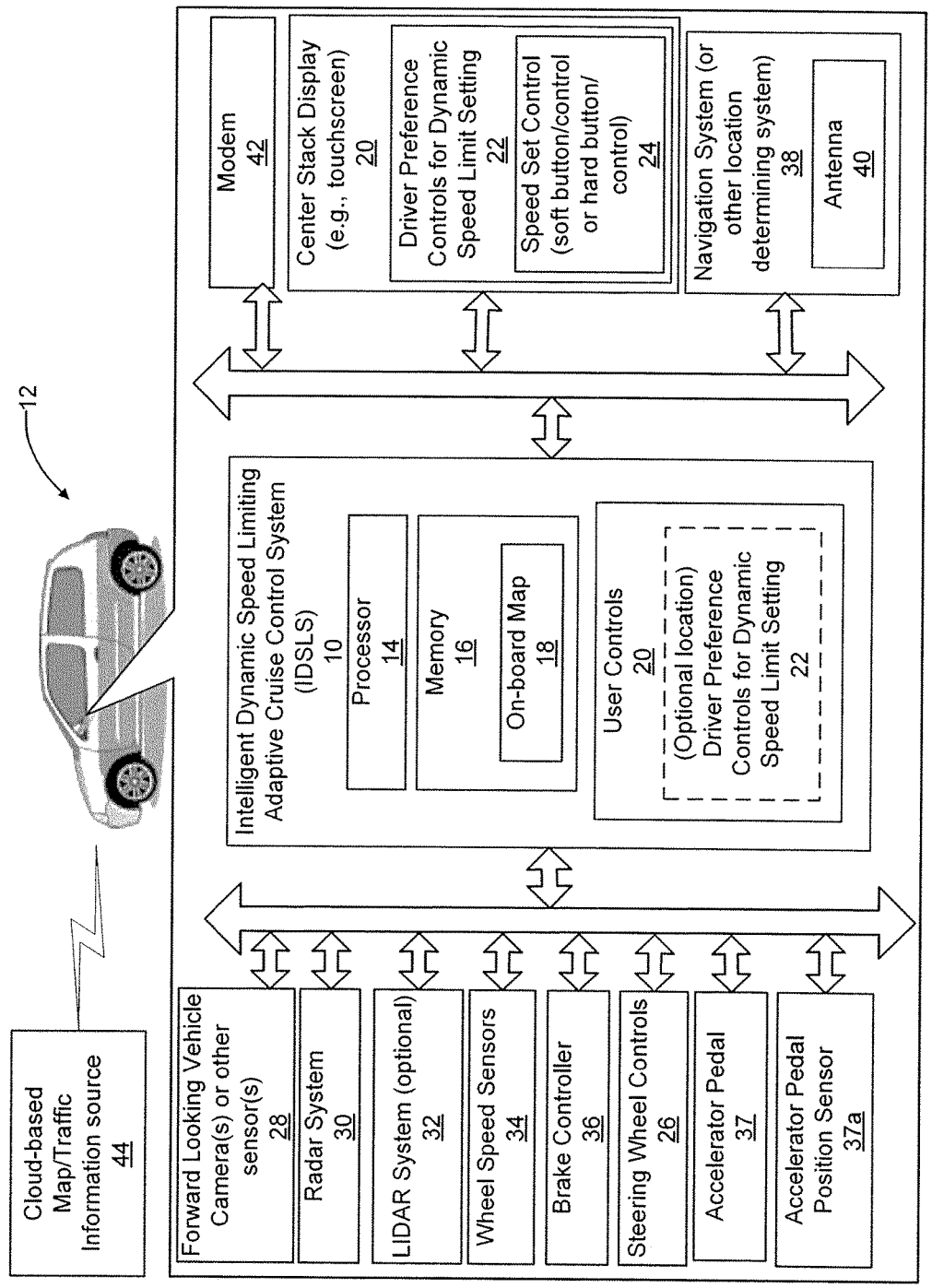
FIG. 1 is a high level block diagram of one embodiment of an intelligent dynamic speed limiting adaptive cruise control system deployed in a vehicle, and showing an optional communication link with a Cloud-based traffic/information source.

Referring to FIG. 1 there is shown an intelligent, dynamic speed limiting adaptive cruise control system (simply "ACCS") 10 in accordance with one embodiment of the present disclosure. The system 10 is shown incorporated for use in a motor vehicle 12. The motor vehicle is shown as a passenger car, although it will be appreciated that the system 10 may be used with any type of motor vehicle, for example an SUV, a full size van, a minivan, a truck, etc., and therefore is not limited to use with only one type of vehicle.

The IDSLS 10 in this example may incorporate a processor 14, a non-volatile memory 16 having an optional on-board map of a given region or territory (e.g., map of the United States, Europe, Middle East, etc.), a group of user controls 18. The IDSLS 10 may be in communication with a center stack display (e.g., touchscreen display) 20 having driver preference controls 22. The driver preference controls 22 may include a soft button (or other form of soft control) acting as a speed set control 24 to enable the user to set a speed increase value that the vehicle speed can be increased by over a speed limit for a given road. This maximum speed increase value may be a percentage value, a fixed miles per hour (mph) value or kilometers per hour (kph) value, or some combination of both. The speed increase value may be stored in the memory 16 and read by the processor 14 when needed. Optionally, the speed increase value may be stored in any other memory accessible by the processor 14, although it is preferable that whatever type of memory is used that it be a non-volatile memory.

Optionally, speed set control 24 may be a hard button or hard control. And while the center stack display 20 forms a particularly advantageous location for implementing the speed set control 24, it will be appreciated that this control may optionally be located at virtually any other location with the vehicle, for example along with the IDSLS user controls 18. Still further, the driver preference controls 22 may be included as part of steering wheel located controls 26. Other possible locations could be, without limitation, on a vehicle door, an overhead console, a center console, etc.

Referring further to FIG. 1, the IDSLS 10 may be in communication with one or more other vehicle subsystems such as a forward looking camera 28 or other form of sensor, a radar system 30, a LIDAR (Light Detection and Ranging) system 32, wheel speed sensors 34, a brake controller 36, an accelerator pedal 37, an accelerator pedal position sensor 37 responsive to a position of the accelerator pedal 37, and a navigation system 38 having a suitable antenna 40. The navigation system 38 may also be replaced by a location reporting subsystem which simply provides the geospatial coordinates (latitude and longitude) from which the location reporting system is able to determine the vehicle's real time location. From this information, the processor 14 may then determine, using map information, what the posted speed limit is for the road that the vehicle 12 is travelling on. Virtually any other location indicating subsystem that can provide information to enable the processor 14 to determine the vehicle's location may be used.

Still further, the IDSLS 10 may optionally include a modem (e.g., 3G or 4G) which enables the IDSLS 10 to be provided with map data (e.g., speed limit information for the road being travelled), as well as real time traffic and/or road construction information. The real time vehicle speed may be obtained by the processor 14 from the brake controller 36 using information reported from the wheel speed sensors 34, or by any other suitable method that can report information to the processor which informs the processor of the vehicle's speed.

It is anticipated that the on-board map data from on-board map 18 may be a primary source for determining what a speed limit is for the road that the vehicle 12 is currently travelling on. By using the vehicle's 12 navigation system 38 (or alternatively the less robust location reporting subsystem), the IDSLS 10 is able to determine the vehicle's location. Optionally, the LIDAR system 32 and/or the radar system 30 may be used to help detect landmarks which the processor 14 can use to help determine the vehicle's real time location. Regardless of the way in which the vehicle's location is determined, once the IDSLS 10 knows the vehicle's location, the processor 14 is able to determine the road that the vehicle is travelling on. This may be accomplished by the processor 14 accessing the on-board map 18 and determining a road that the vehicle is travelling on as well as a posted speed limit for the road. Optionally, the camera 28 may provide real time images to the IDSLS 10 which enable the processor 14 to determine (or confirm) a posted speed limit for the road that the vehicle 12 is travelling on. Optionally, the IDSLS 10 may use information obtained from the cloud-based map/traffic information source 44 to determine a current speed limit for the road being travelled. For example, the camera 28 may detect a speed limit sign when road construction is present giving a reduced speed limit of 25 mph on a road that otherwise has a posted speed limit of 45 mph. Such information could also be provided to the IDSLS 10 via the cloud-based map/traffic information source 44. In such instances where two conflicting speed limits are provided to the IDSLS 10, the IDSLS may select the lower of the two.

If the IDSLS 10 is configured to allow the user to input a percentage speed increase value, then this value may be further dynamically modified by the processor 14 depending on the posted speed limit of the road that the vehicle is travelling on to enable a greater range of speed adjustment. For example, if the user inputs a 20% percentage speed increase value, the processor 14 could be configured to allow a slightly greater percentage at very low posted speed limits (e.g., 25 mph or below), for example an additional 10% to bring the percentage speed increase value up to 30%. So in this example, when the vehicle 12 is travelling on a road with a posted 15 mph speed limit, the 20% speed increase value would only allow a 3 mph vehicle speed increase (i.e., to a maximum of 18 mph), whereas the 30% speed increase would allow a maximum vehicle speed of 19.5 mph. The percentage variability could be tailored in any desired fashion. As a further example, at posted limits of 65 mph or higher, no additional percentage increase could be implemented by the processor 14. At speeds between 35 mph-55 mph, the processor 14 may add an additional 5% to the user's selected percentage speed increase value, and at speeds up to 35 mph the processor 14 may allow an additional 10% to be added to the user selected percentage speed increase value.

Still further, the speed increase value could be a user selected fixed mph value that could be dynamically modified by the processor 14 depending on the posted speed limit for the road that the vehicle 12 is travelling on. For example, the IDSLS 10 may make use of two or more fixed speed limit values, for example fixed limit 1 (e.g., 5 mph, labelled FL1), fixed limit 2 (e.g., 7.5 mph, labelled FL2) and fixed limit 3 (10 mph, labelled FL3). FL1 may be used by the processor 14 when the posted speed limit is less than a certain predetermined speed limit (e.g., 35 mph), FL2 may be used when the posted speed limit is between a predefined range (e.g., 35 mph-69 mph), and HL3 may be used as the fixed limit when the posted speed limit is 70 mph or above. The user may be provided with the option to input two or more of the fixed limit speed values, or these could be programmed into the IDSLS 10 during its manufacture. Still further, the percentage control input by the user could be used in tandem with this multi-fixed limit control methodology.

The IDSLS 10 provides a significant advantage over pre-existing speed limiting systems by enabling a dynamic speed limit setting to be implemented. By "dynamic" it is meant a speed limit setting that represents a user determined (either fixed or percentage based) increase over a posted speed limit for a given road being travelled by the vehicle 12. The user may select, for example, "10%" as a speed limiting value, and the IDSLS 10 will limit the speed of the vehicle to 10% over the posted speed limit. Optionally, the IDSLS 10 may be programmed with a "hard" limit increase, for example a maximum of 10 mph, that the IDSLS 10 will allow. In this instance, if the user has selected a 20% speed increase limit via the control 24, and the posted speed limit is 70 mph, the processor 14 will not allow the full 20% speed increase to be implemented, which would take the vehicle speed up to 84 mph. Instead, the programmed 10 mph hard limit will limit the vehicle speed to a maximum of 10 mph over the posted speed limit (e.g., in this example to 77 mph). As noted above, the hard limit may be programmed into the IDSLS 10 during manufacture. Optionally, the hard limit may be implemented as a user settable value through the speed set control 24 if the speed increase value is implemented as a percentage value. This would provide the user with an even greater degree of control by using both percentage and fixed user selectable values to dynamically control the maximum vehicle speed.

The IDSLS 10 thus enables a dynamic speed limiting function to be implemented. This is a significant convenience for the vehicle user. The user is not required to reset the vehicle speed limit when travelling on city and highway roads where posted speed limits vary dramatically. The user may simply set the speed set control 24 for a desired speed increase value (i.e., percentage value, fixed value or combination of both) and the IDSLS 10 will dynamically modify the speed limit setting based on the posted speed limit of the road that the vehicle 12 is presently travelling on.

Figure 2A:
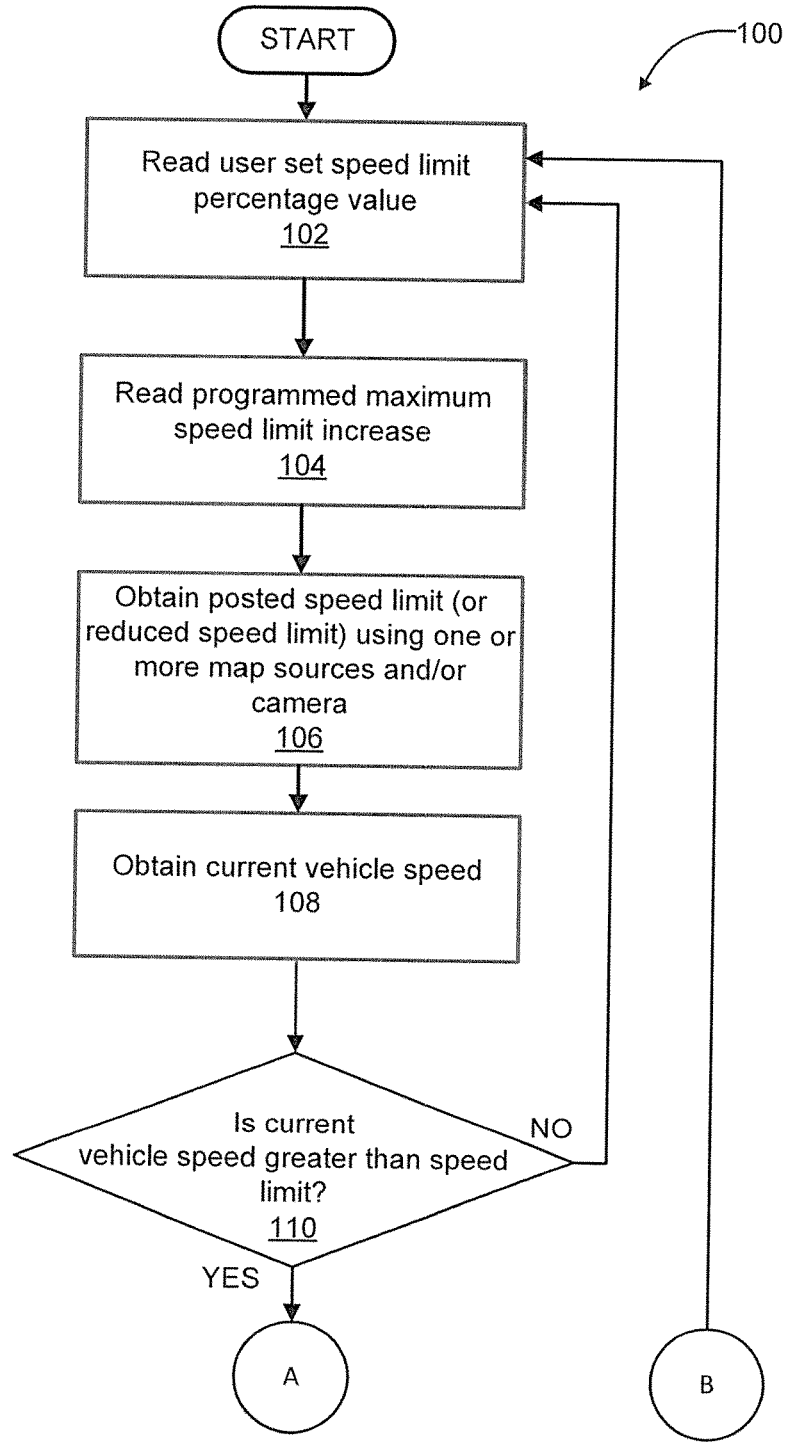
FIGS. 2A and 2B represent a high level flowchart that illustrate various operations that may be performed by the system shown in FIG. 1 in dynamically controlling a speed limiting operation for the vehicle.
Figure 2B:
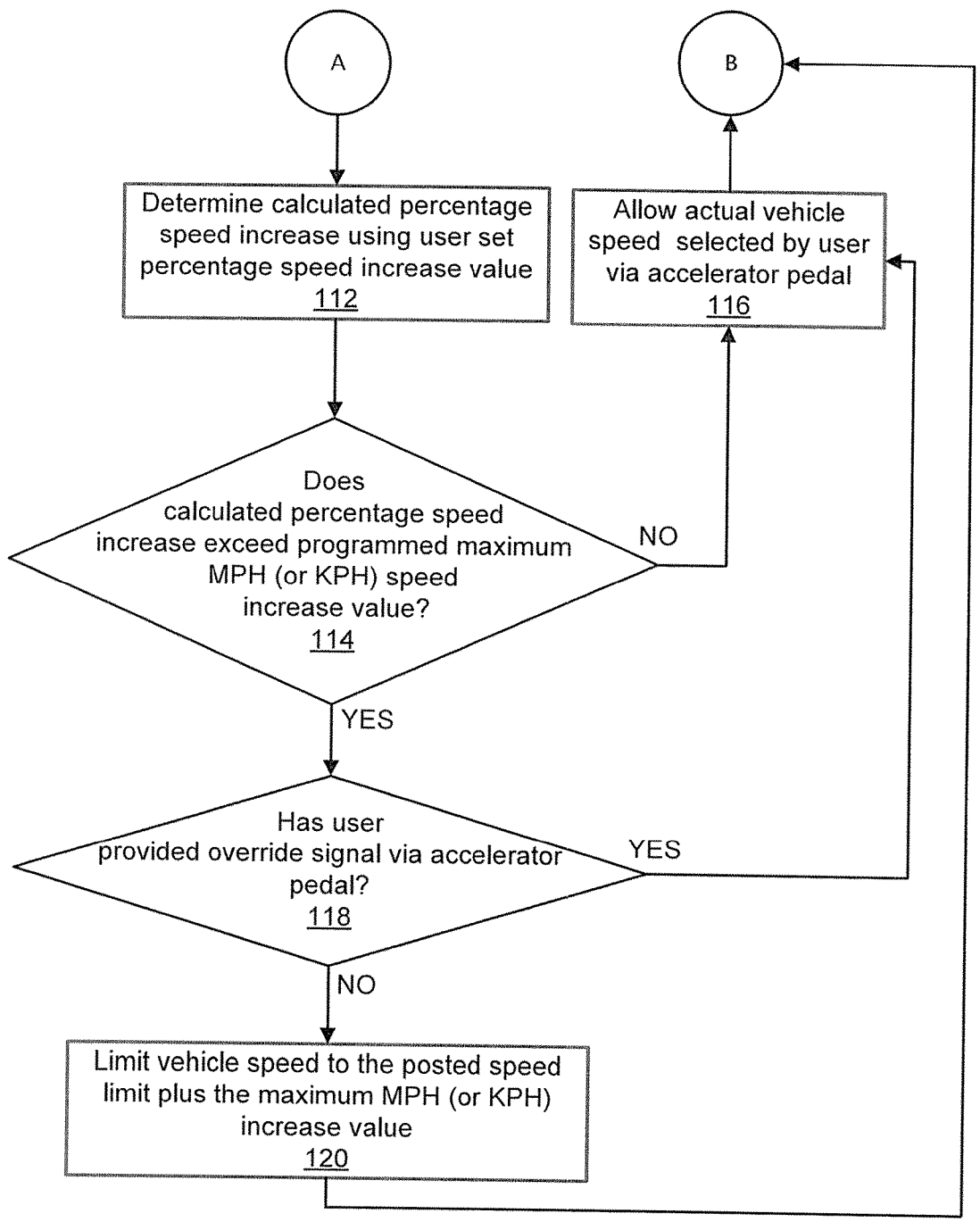

Referring to FIG. 2, a flowchart 100 is shown to further illustrate and explain operation of the IDSLS 10. For this example it will be assumed that the speed control value is a percentage value that the user is inputting, and that the hard limit is programmed into the processor 14 during manufacture of the IDSLS 10. At operation 102 the processor 14 of the IDSLS 10 may read the user set speed limit percentage value. At operation 104 the IDSLS 10 may read the programmed maximum speed limit increase. Again, the "programmed maximum speed limit increase" represents a miles-per-hour or kilometers-per-hour value (e.g., 5 mph, 10 kph, 10 mph, 20 kph, etc.) that defines an absolute limit on the speed increase that the IDSLS 10 will implement (e.g., a maximum of 10 mph).

At operation 106 the IDSLS 106 may obtain the posted speed limit for a given road that the vehicle 12 is travelling on by accessing the on-board map 18 and/or an image(s) obtained by the camera 28 and/or the Cloud-based map/traffic information source 44, or combinations of these sources. If two or more of these information sources 18, 28 and 44 produce a conflicting speed limit, then the processor 14 may be programmed to make a selection according to a predetermined methodology, fox example selecting the lowest one of the posted speed limits from the information sources 18, 28 and 44. Any other arbitration/selection criteria or methodology may be used, and the IDSLS 10 is not limited therefore to only making use of the lowest reported one of the posted speed limits.

At operation 108 the IDSLS 10 may obtain the current vehicle speed. Typically this may be provided by the brake controller 36, although the IDSLS 10 may use information from any other information source or subsystem on the vehicle 12 that can report the vehicle's speed to the IDSLS.

At operation 110 the IDSLS 10 may determine if the current vehicle speed is greater than the posted speed limit. If this determination produces a "No" answer, then operations 102-110 may be repeated. If the determination at operation 110 produces a "Yes" answer, then at operation 112 (FIG. 2B) the IDSLS 10 may determine the calculated percentage speed increase using the user set percentage speed increase value (e.g., 20%). At operation 114, the IDSLS 10 then may make a check to determine if the calculated percentage speed increase exceeds the programmed hard limit maximum mph (or kph) speed increase value. If this check produces a "No" answer, then the IDSLS 10 allows the actual vehicle speed selected by the user via the vehicle's 12 accelerator pedal 37 operation, as sensed by accelerator pedal position sensor 37 and reported to the processor 14, as indicated at operation 116. Operations 102-110 may then be repeated.

If the check at operation 114 produces a "Yes" answer, then the IDSLS 10 may make a check, as indicated at operation 118, if the user has provided an override signal, for example by a hard press on vehicle accelerator pedal 37. If the answer to this check is "Yes", then the IDSLS 10 may allow the actual vehicle speed commanded by the user through the accelerator pedal 37 position, as indicated at operation 116. Operations 102-110 may then be repeated.

It will also be appreciated that the override signal could be determined from either a percentage of accelerator pedal 37 travel, or by detecting a velocity or acceleration of the accelerator pedal travel.

If the check at operation 118 reveals that the user has not provided an override signal, then at operation 120 the IDSLS 10 limits the vehicle speed to the posted speed limit value plus the programmed maximum mph (or kph) value. So for example, if the IDSLS 10 determines that the posted speed limit is 70 mph, and the programmed hard maximum mph increase is 10 mph, then the vehicle speed will be limited to 80 mph, regardless if the percentage speed increase selected by the user calls for a greater speed. Operations 102-110 may then be repeated.

The IDSLS 10 thus provides a dynamic manner of modifying a speed limiting operation on a motor vehicle. The IDSLS 10 can be implemented with only minor modifications to existing vehicle speed limiting systems. The IDSLS 10 eliminates the need for the vehicle user to repeatedly change the speed limit value when travelling on city roads and highways, where one specific speed limit value may be inappropriate for both types of roads.

And while the IDSLS 10 has been described in the above example as being implemented in a motor vehicle such as a passenger car or truck, it will be appreciated that the teachings described herein may be implemented on motorcycles and other wheeled vehicles that are driven on roads having widely differing posted speed limits.

The above description is merely exemplary in nature and is not intended to limit the present disclosure, application, or uses. It should be understood that throughout the drawings, corresponding reference numerals indicate like or corresponding parts and features.

What is claimed is:

1. An intelligent dynamic speed limiting system for use with a motor vehicle, the system comprising:
   a processor;
   a memory in communication with the processor;
   a source of map information that provides posted speed limit information for roads in a geographic region;
   a speed set control configured to enable a user to select a speed increase value by which a speed of the vehicle may exceed a posted speed limit; and
   the processor configured to:
      use the speed increase value set by the user to determine an additional speed increment;
      obtain a posted speed limit for a road the vehicle is traveling on from the posted speed limit information in the source of map information and use this obtained posted speed limit and the additional speed limit to determine a relative speed limit relative to the obtained posted speed limit where the relative speed limit is the obtained posted speed limit plus the additional speed increment; and
      limit the vehicle speed to the relative speed limit.

2. The system of claim 1, wherein the speed increase value comprises a percentage speed increase value.

3. The system of claim 2, wherein the percentage speed increase value is further modified by the processor in accordance with the obtained speed limit.

4. The system of claim 1, wherein the source of map information comprises a map stored in the memory, the map having the posted speed limit information for roads within the geographic region.

5. The system of claim 1, further comprising a forward looking camera on-board the vehicle for obtaining images of speed limit signs from which the processor is able to determine a specific posted speed limit on a road on which the vehicle is being operated, the processor using the determined specific posted speed limit instead of the obtained posted speed limit in determining the relative speed limit when the determined specific posted speed limit differs from the obtained posted speed limit.

6. The system of claim 1, further comprising a Cloud-based map/traffic information source for wirelessly supplying map data including posted speed limit information to the processor.

7. The system of claim 1, further comprising a touchscreen display on which a user speed set control is displayed for enabling the user to set a selected speed increase value.

8. The system of claim 7, wherein at least one of:
the touchscreen display forms a center stack display of the vehicle;
at least one of a navigation system or a location system is carried on-board the vehicle for obtaining location information for the vehicle.

9. The system of claim 1, further comprising a maximum speed increase value stored in the memory, which the processor is configured to use to determine a maximum speed limit value for the vehicle on a given road and to limit the vehicle speed to the lower of the maximum speed limit value or the relative speed limit.

10. The system of claim 9, further comprising an accelerator position sensor operably associated with an accelerator of the vehicle for receiving an override signal from the vehicle user, the processor configured to receive the override signal and to allow a vehicle speed which is greater than the maximum speed limit value.

11. The system of claim 1, further comprising a brake controller in communication with the processor for supplying vehicle speed information to the processor.

12. An intelligent dynamic speed limiting method for use with a motor vehicle, the method comprising:
using a source of map information to provide posted speed limit information for roads in a geographic region;
using a speed set control configured to enable a user to select a speed increase value by which a speed of the vehicle may exceed a posted speed limit;
storing the user selected speed increase value in a memory;
using a processor that performs the steps of:
reading the speed increase value from the memory, and obtaining, using the source of map information, a posted speed limit for a road that the vehicle is travelling on;
using the speed increase value to determine an additional speed increment;
using the obtained posted speed limit and the additional speed increment to determine a relative speed setting relative to the obtained posted speed limit where the relative speed limit is the obtained posted speed limit plus the additional speed increment and
limiting vehicle speed to the relative speed limit.

13. The method of claim 12, further comprising programming a maximum speed increase value into the memory which represents a maximum speed increase value that can be added to the obtained posted speed limit, and using the processor to limit the vehicle speed to the lower of the relative speed limit or the obtained speed limit plus the maximum speed increase value; and
wherein using a source of map information comprises at least one of:
using an on-board map stored in the memory;
using a Cloud-based map/traffic information source to obtain posted speed limit information.

14. The method of claim 12, further comprising using a navigation system carried on-board the vehicle to determine a location of the vehicle.

15. The method of claim 12, further comprising using an accelerator pedal position sensor to inform the processor if the user has input an override signal, and using the processor to allow a vehicle speed responsive to an accelerator pedal position when the override signal is received.

16. The system of claim 1 wherein the processor is configured to periodically obtain from the source of map information the posted speed limit for the road that the vehicle is traveling on and use a most recently obtained posted speed limit for the road the vehicle is traveling as the obtained posted speed limit in determining the relative speed limit.

17. The method of claim 12 wherein using the processor includes using the processor configured to periodically obtain from the source of map information the posted speed limit for the road that the vehicle is traveling on and use a most recently obtained posted speed limit for the road the vehicle is traveling on as the obtained posted limit in determining the relative speed limit.

* * * * *